United States Patent [19]
Paulsen et al.

[11] Patent Number: 6,055,575
[45] Date of Patent: Apr. 25, 2000

[54] VIRTUAL PRIVATE NETWORK SYSTEM AND METHOD

[75] Inventors: Gaige B. Paulsen, Great Falls; Amanda Walker, Reston, both of Va.

[73] Assignee: Ascend Communications, Inc., Alameda, Calif.

[21] Appl. No.: 09/013,122

[22] Filed: Jan. 26, 1998

Related U.S. Application Data

[60] Provisional application No. 60/035,215, Jan. 10, 1997.

[51] Int. Cl.[7] .................................................. G06F 13/00
[52] U.S. Cl. .......................... 709/229; 709/228; 709/226; 709/245
[58] Field of Search ................................... 709/245, 229, 709/228, 226; 380/23, 30

[56] References Cited

U.S. PATENT DOCUMENTS

| | | | |
|---|---|---|---|
| 5,416,842 | 5/1995 | Aziz | 380/30 |
| 5,548,646 | 8/1996 | Aziz et al. | 380/23 |
| 5,550,984 | 8/1996 | Gelb | 709/245 |
| 5,835,726 | 11/1998 | Shwed et al. | 709/229 |
| 5,872,849 | 2/1999 | Sudia | 380/23 |

FOREIGN PATENT DOCUMENTS

| | | | |
|---|---|---|---|
| 0739106A1 | 10/1996 | European Pat. Off. | H04L 9/08 |

*Primary Examiner*—Ahmad F. Matar
*Assistant Examiner*—Philip B. Tran
*Attorney, Agent, or Firm*—Weingarten, Schurgin, Gagnebin & Hayes LLP

[57] ABSTRACT

A system and method for remote users to access a private network having a first communications protocol via a public network, such as any TCP/IP network having a second different communications protocol, in a secure manner so that the remote user appears to be connected directly to the private network and appears to be a node on that private network. A host connected to the private network may execute a host software application which establishes and provides a communications path for secure access of the remote client computer. An encrypted data stream may be communicated between the host and the client representing traffic and commands on the network.

28 Claims, 2 Drawing Sheets

VIRTUAL PRIVATE NETWORK SYSTEM AND METHOD

This application claims benefit of provisional application Ser. No. 60/035,215 filed Jan. 10, 1997.

BACKGROUND OF THE INVENTION

This invention relates generally to apparatus and methods for accessing computer networks and in particular to establishing a secure connection between a remote computer and a private computer network using a public computer network.

In the past, organizations and companies have used private (internal) computer data networks to connect its users to each other. These private networks are not accessible to the public and permit sensitive data to be transferred between users within the company. However, due to the increasing numbers of people who need access to the private computer data network and the disparate locations of these people, there are several disadvantages of these conventional private computer networks.

As the number of people in a company grows, the workforce becomes more dispersed among different locations and there are more employees who are mobile, such as salespeople who travel around a region of the United States. For example, some employees may telecommute which requires dial-up access to the private computer data network. The dispersed workforce and the mobile workforce make a private computer data network unmanageable because this mobility requires at least two network connections for each user. In addition, since cellular telephone access has also become more available, additional connections to the network for this access is needed. In addition, full-time telecommuters dramatically increase the number of permanent "remote offices" a company must interconnect which further complicates the private computer data network administration and topology. In addition, as companies increase in size, due to acquisitions, mergers and expansion, the private computer data network must support more remote offices and more network nodes. Thus, as a organization expands, the private computer data network of the organization becomes unwieldy and unmanageable.

Recently, it has become necessary and desirable to permit employees of the company to interact "on-line" with customers and suppliers. This function adds a new dimension of complexity to the private computer data network since multiple private computer data networks must be interfaced together in a delicate balance of integration while maintaining some isolation due to security concerns. The individual networks that are being integrated together typically use different data transfer protocols, different software applications, different data carriers and different network management systems. Thus, interfacing these private computer data networks is a major challenge.

There is also a desire to consolidate and simplify the user interface to the computer network as well as to the software applications being executed by the computer network since it is often difficult to keep on top of each new software application. Thus, the costs of implementing and maintaining a private computer data network is high and is expected to increase in the future as the factors set forth above continue to drive up the costs of the private computer data networks. These high costs are compounded by the high costs for long distance telephone charges for leased lines and switched services. The number of support staff necessary to manage the complex topologies of these private computer data networks also further increases the costs to manage the private computer data networks. In addition, software applications which execute over the private network require separate backup equipment which further complicates the topology and increases the cost of the private computer data network. Thus, the costs and complexity of these private computer data networks are continuing to spiral upwards and there is no foreseeable end in sight.

A typical private computer data network may be used by a organization for some of its communications needs and may carry exclusively data traffic or a mix of voice/video and data traffic. The private computer data network may be constructed with a variety of wide area network (WAN) services that often use the public switched telephone network (PSTN) as a communications medium. A typical network may use high speed leased lines that carry voice, facsimile, video and data traffic between major facilities. These leased lines may include integrated services digital network (ISDN) lines or conventional T1 telephone lines. Because these leased lines are point-to-point connections, a mesh topology is necessary to interconnect multiple facilities. In addition, each leased line must be dedicated to a particular interconnection. A remote office may use switched services over the PSTN, such as ISDN or frame relay. For individual mobile employees, an analog modem may be the best solution for connection to the private computer data network. The private computer data network with all of these different connections, therefore, is very expensive to implement and maintain for the reasons set forth above.

A virtual private network (VPN), on the other hand, may offer the same capabilities as a private computer data network, but at a fraction of the cost. A virtual private network is a private data network that uses a public data network, instead of leased lines, to carry all of the traffic. The most accessible and less expensive public data network currently is the Internet which can be accessed worldwide with a computer and a modem. An Internet-based virtual private network (VPN) is virtual because although the Internet is freely accessible to the public, the Internet appears to the organization to be a dedicated private network. In order to accomplish this, the data traffic for the organization may be encrypted at the sender's end and then decrypted at the receiver's end so that other users of the public network can intercept the data traffic, but cannot read it due to the encryption.

A VPN can replace an existing private data network, supplement a private data network by helping relieve the load on the private data network, handle new software applications without disturbing the existing private data network or permit new locations to be easily added to the network. A typical VPN connects one or more private networks together through the Internet in which the network on each side of the Internet has a gateway and a leased line connecting the network to the Internet. In these typical VPNs, the same protocol for each private network, such as TCP/IP, is used which makes it easier to communicate data between the two networks. To create the VPN, a secure communications path between the two gateways is formed so that the two private networks may communicate with each other. In this configuration, however, each network is aware that the other network is at some other location and is connected via a router. As an example, if a company has a central private network in California and a remote office in Hong Kong, these two private networks may be connected via the VPN which reduces long distance telephone call charges. However, if a single individual is traveling in Hong Kong and want to connect to the private network in California, the individual must incur long distance telephone charges or, if there is a remote office in Hong Kong, then the entire private network must be connected via the VPN to the California private network to communicate data. In addition, with the conventional VPN described, the individual in Hong Kong is aware that he is connected to the Hong Kong network which is in turn connected, via the gateway and the VPN, to the network in California so that the person in Hong Kong cannot, for example, easily use the network resources of the California network, such as a printer.

Thus, a conventional VPN requires the expense of a leased line and a gateway at each end of the VPN and cannot adequately address the needs of a individual who needs access to the private network. In addition, these conventional VPNs cannot easily connect networks which have different networking protocols. In addition, these conventional VPNs cannot be easily used for connecting an individual who needs remote access to the private network since the entire network with a gateway is needed.

Thus, the invention provides a virtual private network (VPN) which avoids these and other problems with conventional VPNs and it is to this end that the invention is directed.

SUMMARY OF THE INVENTION

In accordance with the invention, a virtual private network system is provided which connects a private data network and a remote client which does not require expensive leased lines or gateways to establish a secure communications path. The system also permits an individual to access the private data network without incurring any long distance telephone charges. In addition, the system permits a private data network and remote client that use one communications protocol to communicate with each other over a public data network that uses a different communications protocol. The system also permits an individual to easily connect to the private date network without a remote private network and the individual appears to be a node on the private network, once connected, so that the individual may access any resources on the private data network.

In accordance with the invention, a system and method for forming a communications path between a public access network and a private access network where the two networks have substantially incompatible transmission protocols is provided. The method comprises establishing a secure communications path over the public access network between a host computer connected to the private network and a remote client computer, encrypting data and commands of the host computer and the client computer, and formatting the encrypted data and commands into a format compatible for transmission over the public access network. The formatted data and commands are then transmitted over the public access network. Once the formatted data and commands has reached its destination, it is decrypted to establish the client computer as a virtual node on the private network. In accordance with another aspect of the invention, a data structure for communicating data for a private data network having a first communications protocol over a public access network having a second communications protocol is provided.

DETAILED DESCRIPTION OF A PREFERRED EMBODIMENT

The invention is particularly applicable to a system and method for providing a virtual private network which permits remote users to access a private network, such as an AppleTalk network, via a public TCP/IP network, such as the Internet, in a secure manner as if the remote user was one of the nodes on that private network. It is in this context that the invention will be described. It will be appreciated, however, that the system and method in accordance with the invention has greater utility. Before describing the invention, a brief description of a conventional virtual private network (VPN) will be provided.

Figure 1:
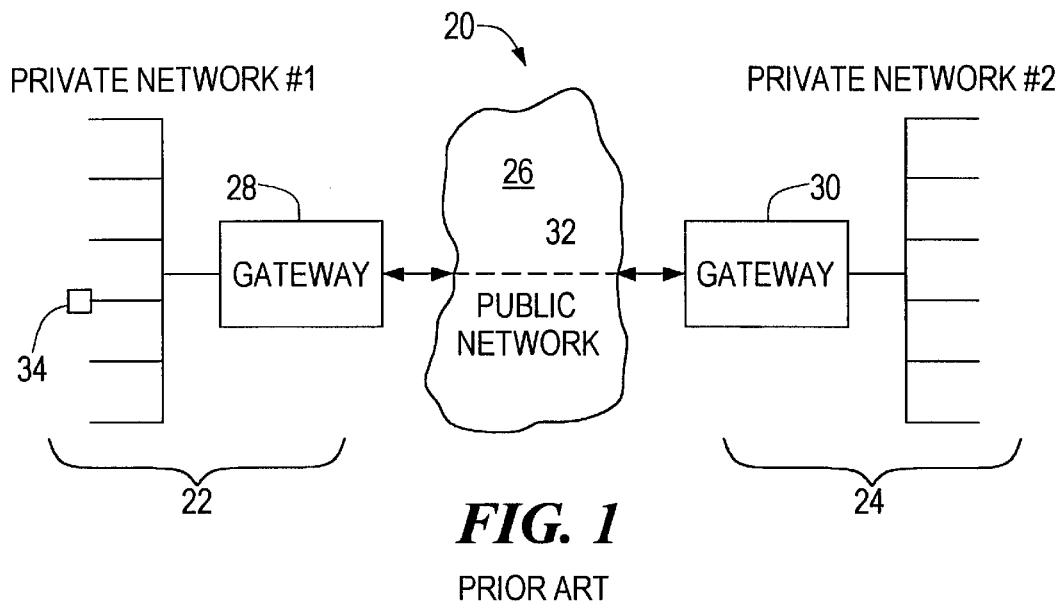
FIG. 1 is a block diagram illustrating a conventional virtual private network.

FIG. 1 is a block diagram illustrating a conventional virtual private network (VPN) 20. The VPN includes a first private network 22 and a second private network 24 connected together through a public computer network 26, such as the Internet. The communications protocols for the first and second private networks as well as the public network may be the standard Transmission Control Protocol/Internet Protocol (TCP/IP). Thus, the communications protocols for the private networks are the same as the public network. Each private network 22, 24 includes a gateway 28, 30 which interfaces between the respective private network and the public network. Each gateway encrypts data traffic from the private network which is going to enter the public network and decrypts encrypted data received from the public network. In normal operation, a secure communications path 32, referred to as a tunnel, is formed over the public network that connects the first and second private networks through the respective gateways. The combination of the two private networks and the tunnel over the public network forms the virtual private network (VPN). The VPN is virtual since it is actually using a public network for the connection, but due to the encryption both private networks believe that they have a private network over which data may be sent. For example, a node 34 of the first private network 22 may send data which is encrypted by the gateway 28 through the tunnel 32, and the data is received by the second gateway 30 which decrypts the data and routes it to the appropriate node in the second private network. This conventional VPN, however, does not adequately provide an individual remote user with a system for remotely accessing the private network because the conventional VPN connects two networks with a tunnel and would require the individual to be connected to one of the private networks to utilize the VPN. In addition, this conventional VPN does not connect a remote individual directly to the private network so that a remote user with a VPN connection cannot directly access resources, such as a printer, connected to the private network. This conventional system also does not handle computer networks which have different communications protocols. Now, the virtual private network system in accordance with the invention will be described which overcomes these problems with a conventional VPN.

Figure 2:
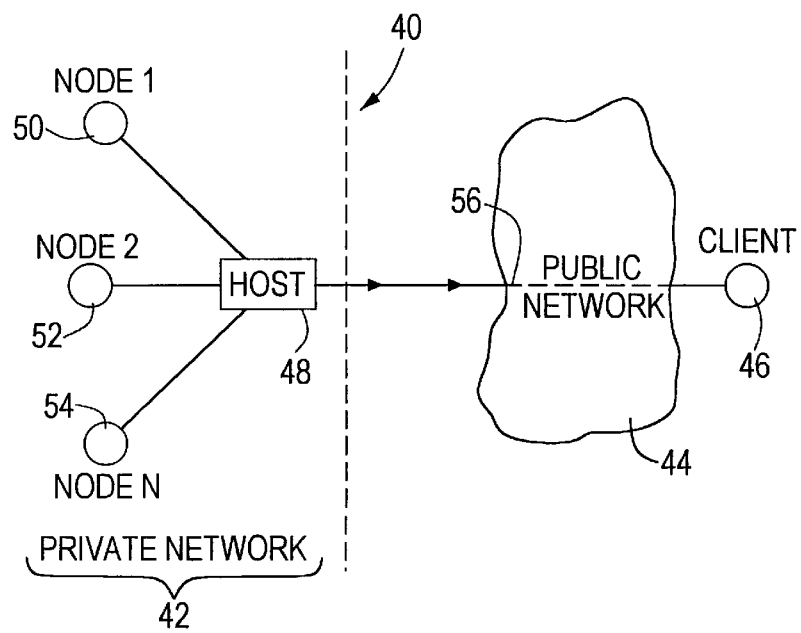
FIG. 2 is a block diagram illustrating a virtual private network in accordance with the invention.

FIG. 2 is a block diagram illustrating a virtual private network (VPN) 40 in accordance with the invention. The VPN may include a private network 42 which communicates data using a first communications protocol, a public network 44 which communicates data using a second communications protocol, and a client node 46 that is connected for secure communications to the private network 42 through the public network 44 as described below. The private network 42 may be any type of computer network, such as an AppleTalk network. The public network may be any type of publicly accessible computer network such as the Internet.

The private network 42 may include a host computer 48, and a plurality of network nodes, such as a first node (NODE_1) 50, a second node (NODE_2) 52, and an nth node (NODE_N) 54 which are all connected to the host computer. In normal operation any node of the private network may share resources with any other node on the network. For example, any node of the private network may share a printer which is attached to the private network. The host computer 48 establishes a secure communications path 56, referred to as a tunnel, through the public network 44 with the remote client 46 by negotiating the communications protocol with the client 46 and authenticating the identity of the client. Once the secure tunnel has been established between the private network 42 through the host computer 48 and the public network 44 with the remote client 46, the remote client is treated as a node of the private network and uses the communications protocol of the private network even though the public network uses a different protocol. Thus, the remote client 46 may access resources connected to the private network, such as a printer, as if the remote client were directly connected to the private network. Therefore, with the VPN in accordance with the invention, the various connections between the remote client and the private network are transparent to the user of the remote client since the user can use the private network in any manner that a user directly connected to the private network can.

With the VPN in accordance with the invention, a gateway at each end of the virtual private network is not required. In addition, data traffic for the private network which has a first data communications protocol may be communicated over a public computer network which has a different communications protocol. In particular, the system encapsulates the data destined for the private data network having a first protocol in a data packet that may be sent over the public network, as described in more detail below. Thus, once the secure virtual private network connection has been established, the remote client may interact with the private network as if the remote client was directly connected to the private network. The virtual private network in accordance with the invention also permits an individual remote user to easily establish a connection with a distant private network without the need for a remote private network and a leased line or long distance telephone charges. Now, more details about the host computer 48 and the remote client 46 in accordance with the invention will be described.

Figure 3:
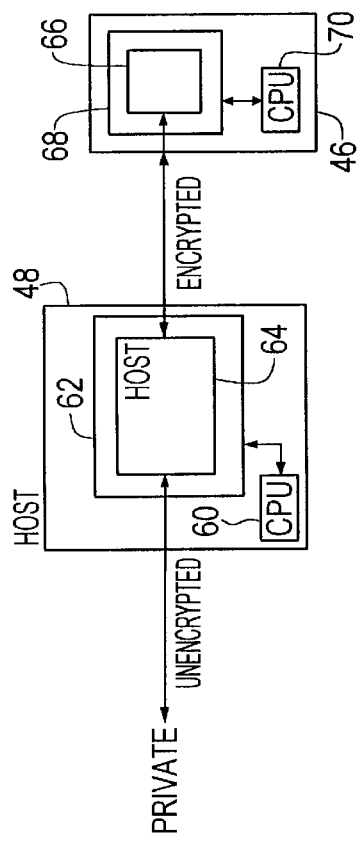
FIG. 3 is a block diagram illustrating more details of the host computer of FIG. 1.

FIG. 3 illustrates more details of the host computer 48 and the remote client 46 in accordance with the invention. The host computer 48 may include a central processing unit (CPU) 60, a memory 62 and a host 64 stored in the memory 62. The host may be a software application which is executed by the CPU 60 of the host computer. When a remote client contacts the private network 42 to establish a secure connection, the host 64 may negotiate and establish the secure virtual connection to the remote client 46, as described below. Once the secure connection has been established, the host 64 accepts unencrypted data from the private network, combines the data with a header containing information about the protocol of the private data network, encrypts the data and the header, and communicates the encrypted data and header, over the secure communications path, to the remote client. The host also receives encrypted data with a header from the remote client, decrypts the data and the header, and passes the data traffic onto the appropriate node in the private network based on the header information, as described below.

Similarly, at the remote client 46, a client software application 66 stored in a memory 68 in the client computer 46 is executed by a central processing unit (CPU) 70 in the client computer 46. The client 66 negotiates and establishes the secure communications path with the host computer, combines the data with an appropriate header, encrypt the data traffic and the header destined for the client computer, and communicate the encrypted data to the host computer. The client also receives encrypted data traffic from the host computer, decrypts it, and passes the data traffic onto other software application which are being executed by the CPU 70. Thus, the virtual private network in accordance with the invention is software application based so that expensive hardware, such as a gateway and leased lines, are not necessary. The software applications also permit the data between the client and host, which have a first communications protocol, to be communicated over a public computer network which has a second different communications protocol. Now, a method for establishing and communicating data traffic over the virtual private network in accordance with the invention will be described.

Figure 4:
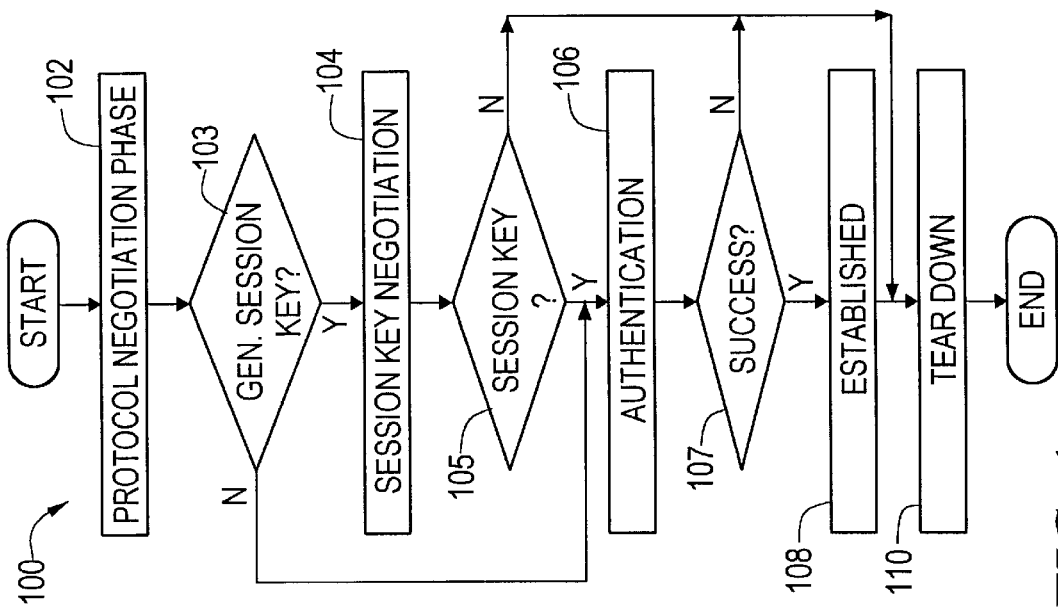
FIG. 4 is a flowchart illustrating a method for establishing a virtual private network and communicating secure data over the virtual private network in accordance with the invention.

FIG. 4 is a flowchart illustrating a method 100 for establishing and communicating data over the virtual private network in accordance with the invention. An example of the phases and data formats for the communications between an AppleTalk network host and an AppleTalk remote client over the Internet will be described below, but the invention is not limited to that example and may be used to communicate data between any hosts and remote clients having a different communications protocol than the public data network. To begin the method, the remote client may request a connection to the host by any conventional method.

In step 102, once the initial unsecure connection has been established between the host and the client, a protocol negotiation phase occurs in which the host and the client negotiate the parameters that will govern the subsequent communications between the host and the client. The negotiated parameters may include the protocol version, the compression level, and the encryption technique. Each of these parameters has a default setting that must be available for either the host or the remote client to request so that there is a minimum set of functionality which may be implemented. To ensure backwards compatibility of any host or remote client, each host or client will implement at least a first protocol version so that there is backwards compatibility for future versions. These parameters will be described in more detail below. In addition, for the encryption parameter, each host and remote client must be able to support both data encryption standard (DES) type encryption as well as some form of non-DES encryption to permit communications between hosts and clients that are licensed for use within the United States as well as outside of the United States. The invention may use a plurality of different well-known non-DES encryption methods and these encryption methods will not be described here. The protocol negotiation phase is started when the connection is established and is initiated by the remote client sending the host a Protocol Request in which it communicates which protocol version it would like to use and any options, such as the encryption, that it would like to use. The host then sends the remote client a Protocol Response verifying the protocol version number and any options. An example of the data formats of the Protocol Request and Protocol Response in the context of an AppleTalk network are provided below.

Once the protocol has been negotiated, it is determined, in step 103, if an optional session key negotiation phase 104 is going to occur. In the first protocol version, the session key negotiation phase is optional, but later versions of the protocol will require the session key negotiation phase. The session key negotiation phase is thus entered if a session key bit in the Protocol Request is set during the protocol negotiation phase. During the session key negotiation phase, data is exchanged between the host and remote client for the purpose of setting up an encryption key that is used for the remainder of the communication. In a preferred embodiment, a well known Diffie-Hellman key exchange method is used, but any other conventional key exchange method may be used. If the session key phase and the Diffie-Hellman key exchange method are not being used, the encryption key is chosen during an authentication phase 106, as described below. The data communicated during the session key negotiation phase may include a length word indicating the length of the data and the data. The data flow is bi-directional and is completed when the host and the remote client have agreed on a session key. If the system determines, in step 105, that a session key has been established, an authentication phase 106 is entered. In the event that a session key is not successfully negotiated during the session key negotiation phase, the method proceeds to a teardown phase 110 in which the communications between the host and the remote client is terminated and the methods ends.

During the authentication phase 106, the remote client and the host negotiate what type of authentication is used for the communications and then provides challenges and responses to authenticate the identity of the remote client. Due to the wide variety of security requirements and methods, the host must, at a minimum, send a request with at least one default authentication type identifier and an associated challenge. However, if the host has the ability to use more than one authentication method, then the host may send the remote client, in a Authentication Request, more than one authentication type identifier and their associated challenges as described below. Thus, to start the authentication phase, the host may communicate an authentication request, as described below, to the remote client. The authentication request may include one or more authentication type/authentication challenge data pairs. In response to the authentication request, the remote client communicates an authentication response back to the host which includes exactly one authentication type/response data pair. If the host sends more than one authentication type/challenge pair, the remote client selects a particular authentication type and responds with the authentication type/response pair for only that particular authentication type. An example of the types of authentication methods is set forth below.

If the session key negotiation phase is not used, then, during a successful authentication phase, an implicit session key may be generated by the remote client. In a preferred embodiment, the session key may be generated by the following steps. First, a Unicode string containing the password from the client is concatenated with the challenge from the authentication request. Next, a SHA-1 hash value over the resultant concatenated data is calculated and the initial bytes of the hash value may then be used as the session key which may be communicated back to the host.

In response to the authentication response, the host determines if the response was successful or not in step 107. If the response was successful (i.e., an appropriate response to the challenge was received which verifies the identity of the remote client), a success data structure is sent to the remote client and the method goes to an established phase 108, as described below. If the response was not successful (i.e., an appropriate response to the challenge was not received so that the identity of the remote client can not be verified), then an error code is sent to the remote client and the teardown phase 110 is entered.

During a typical successful secure communications session, most of the time is spent in the established phase 108 in which encrypted data including the header is communicated between the remote client and the host. The header, as described below, contains information required by the communications protocol of the private network (i.e., the host and the remote client) to appropriately route data. Thus, the communications protocol information for the private network is embedded in the encrypted data packet so that the data destined for the private data network may be communicated over the public network having a different communications protocol. For each piece of encrypted data sent during the established phase, the data may be preceded by a length and flag word which contains the length of the data in bytes and six bits of flags. Since the data is typically sent over a TCP/IP based public network, a PUSH bit in the flag bits must be set to accelerate the processing of the transactions once a complete unit of data has been received.

If an unsuccessful session key negotiation, an unsuccessful authentication, or the end of the established phase occurs, then the tear down phase 110 is begun. During the tear down phase, there is no data traffic between the remote client and the host and the communications channel is forcibly closed by either the remote client or the host. During the teardown phase, when one side shuts down the communications channel, an acknowledgment from the other side may consist of shutting down the connection from that side as well so nothing remains of the communications path. After the teardown phase, the method has been completed. The method, therefore sets up a communication session as needed and then tears down the communications path once the communications have been completed.

Now, an example of the data formats for a system and method in accordance with the invention for communicating AppleTalk data between a remote client and a host over a TCP/IP public network, such as the Internet, will be described. As described above, the virtual private network in accordance with the invention may connect any private network having a first communications protocol to a public network having a second different communications protocol securely to permit remote users to access the private network in a secure manner wherein the remote user appears to be one of the nodes in the private network. In this example, the data formats for each of the communications phases are set forth and explained. For each different private data network with a different communications protocol, these data formats will vary slightly. The bytes of these data formats are sent across the network connection path over the Internet using a Network Byte Order protocol in which the most significant byte is communicated first.

To better understand the utility of the invention in the context of a connection between an AppleTalk private network and a AppleTalk remote client over the TCP/IP-based Internet, the differences between the protocol for the AppleTalk network and the Internet will be described before describing the data formats for this example. AppleTalk is a proprietary suite of networking protocols which is designed for plug-and-play operation whereas TCP/IP is designed to be administered. In particular, the Internet or any other TCP/IP network has been designed such that each node on the Internet is permanently assigned a unique IP address by a quasi-governmental entity. AppleTalk, on the other hand, assigns a node or device number to a node or device when the nodes or devices are actually placed on the network to provide the plug-and-play functionality. Therefore, the two networking protocols assigns network numbers in different manners.

AppleTalk also has a smaller network number range than the Internet and is not centrally administered so that Apple-Talk networks can not be arbitrarily connected to each other without substantial planning to ensure that the connected nodes do not have overlapping network numbers. In AppleTalk, there is also a service location protocol that permits users to locate servers and network devices, such as printers, and AppleTalk has the concept of a "zone" which provide a level of scoping for the service location protocol. In order to access the network services on a particular network, you must have access to the particular zone. One advantage of the invention is that the remote client can avoid the network number and zone addressing by connecting the user of the remote client directly on the AppleTalk network as a virtual node in the zone of the host computer in a secure manner. Thus, once the user of the remote client is securely connected to the AppleTalk network over the Internet, the user sees all of the devices of the AppleTalk network, such as printers and file servers, in a familiar manner which permits them to access any device on the private network. Now, an example of the data formats for the invention when connecting an AppleTalk private network and a remote client over the Internet will be described.

During the protocol negotiation phase, as described above, there is a protocol request from the host and a protocol response from the remote client. The data formats of the protocol request and protocol response are set forth in Tables 1–3 below.

TABLE 1

Protocol Request

| Byte Offset | Width | Contents |
| --- | --- | --- |
| 0 | 2 bytes | Total Bytes: Total number of bytes in the transaction (excluding this field) |
| 2 | 2 bytes | Protocol Version: Protocol version requested. |
| 4 | 2 bytes | Options Bytes: Length of the following data bytes |
| 6 | specified by the previous field | Options: Any options to be requested |

In version 1 of the protocol, the Total Bytes in the protocol request is 6, the Protocol version is 1, the Options Bytes is 2, and the Options field will contain two bytes which represent 16 individual flag bits. For other versions of the protocol, these fields may contain different values. The meanings of the flag bits in the protocol request data format are set forth below in Table 2.

TABLE 2

Option Flag Bits Format

| Byte Location | Meaning |
| --- | --- |
| 15-2 | Reserved for future options. These must be 0 in the first version of the protocol. |

TABLE 2-continued

Option Flag Bits Format

| Byte Location | Meaning |
| --- | --- |
| 1 | Use session key negotiation. If this bit is set, the requester wants to use the Session Key Negotiation phase. If not, it is requested that the phase be omitted. |
| 0 | Use DES encryption. If this bit is set, the requester wants to use DES encryption. If it is not set, an alternate encryption method is to be used. |

Thus, using the options fields in the first version of the protocol, the session key negotiation phase and the type of encryption may be chosen. With future versions of the protocol, additional options may be selected. The format of the Protocol Response will now described with reference to Table 3.

TABLE 3

Protocol Response

| Byte Offset | Width | Contents |
| --- | --- | --- |
| 0 | 2 bytes | Total Bytes: Total number of bytes in the transaction (excluding this field) |
| 2 | 2 bytes | Protocol Version: Protocol version to be used |
| 4 | 2 bytes | Options Bytes: Length of the following data bytes |
| 6 | specified in Options Bytes | Options: Any options that are in use |

The protocol response data uses a similar data format to the Protocol request, and contains the same data. However, when returned from the Host to the Client in the Protocol Negotiation phase, this data establishes the actual communication protocol and data format to be followed during the Established phase. The data communicated during the protocol negotiation phase is unencrypted since the secure communications path has not yet been established. Now, the data formats for the optional session key negotiation phase will be described.

The session key negotiation phase, as described above, may include the session negotiation request and the session negotiation response. The data format for both of these pieces of data are identical for all responses and requests. In particular, each data packet contains a 2 byte length field followed by the data used for the negotiation of the session key for use in the well-known Diffie-Hellman key exchange method. Once again, the data is sent unencrypted since no secure communications channel has been established.

The authentication phase, as described above, may include an authentication request and an authentication response, whose data formats are set forth below in Tables 4–6.

TABLE 4

Authentication Request

| Byte Offset | Width | Contents |
| --- | --- | --- |
| 0 | 2 bytes | Total Bytes: Total number of bytes in the transaction (excluding this field) |
| 2 | 2 bytes | Authentication Type: Identifies the authentication type |
| 4 | 2 bytes | Challenge Bytes: The number of bytes that follow for the challenge (0 or more) |
| 6 | specified in Challenge Bytes | Challenge: The data for the challenge in the authentication. The exact contents vary based on the authentication method. |

As described above, this data must contain at least one authentication type/challenge pair, but may contain more than one authentication type/challenge pair if the host supports more than one type of authentication. In version 1 of the protocol, the Authentication Type must be one of types set forth in Table 5.

TABLE 5

Authentication Types

| Authentication Type | Description |
| --- | --- |
| 0 | No authentication. No bytes follow for the challenge (may not be supported by any server). A 0-length response is expected by Hosts which request this method. |
| 1-Clear Text authentication. | There is no challenge (may not be supported by any server). A 0-length challenge is sent, and the Host expects the user name and password of the client to be sent in clear text. |
| 2 | Challenge-Handshake Authentication Protocol (CHAP)-There is an 8-byte encrypted challenge. A 24-byte response is expected by the Host. This method MAY be supported by Hosts and Clients. |
| 3 | NT RAS compatible CHAP-There is an 8-byte encrypted challenge. A 16-byte response is expected by the Host. This method MUST be supported by all Hosts and Clients. |

As shown, there are several different authentication methods which may be used. The default authentication method is the NT RAS compatible CHAP with an 8 byte challenge and a 16 byte response. Again, since no secure communications path has been established, this data is sent unencrypted. Now, the data format of the authentication response is described with reference to Table 6.

TABLE 6

Authentication Response

| Byte Offset | Width | Contents |
| --- | --- | --- |
| 0 | 2 bytes | Total Bytes: Total number of bytes in the transaction (excluding this field) |
| 2 | 2 bytes | Authentication Type: Identifies the authentication type |
| 4 | 2 bytes | Response Bytes: Number of bytes in the authentication response |
| 6 | specified in Response Bytes | Response: The data which responds to the Challenge. The length and exact contents vary based on the authentication type and the challenge. |
| Response Bytes +6 | up to 32 | User Name: The clear text version of the user name. The name is terminated by the end of the data (based on Total Bytes). |

This authentication response data must contain exactly one response to one of the Authentication Type/Challenge pairs in the preceding Authentication Request. The Client may choose which of the pairs to respond to if more than one appears in the Authentication Request. The User Name in the response specifies which user is requesting access and is used in conjunction with the Response to authenticate the user. This data is also sent unencrypted, unless a session key has been negotiated previously in the Session Key Negotiation phase, in which case it is encrypted.

During the initial portion of the established phase, there may be a success data structure or a failure data structure and then during the actual established phase there may be a data structure for data communicated to the remote client and a data structure for data communicated to the host. These data structures are set forth below in Tables 7–11. If a sucessful secure connection is established, then a connections success data structure, as set forth in Table 7 is sent to the remote client.

TABLE 7

Connection Success

| Byte Offset | Width | Contents |
| --- | --- | --- |
| 0 | 2 bytes | Total Bytes: Total number of bytes in the transaction (excluding this field) |
| 2 | 2 bytes | Success: always contains 0 |
| 4 | 2 bytes | Client Network Number: the assigned network number for the Client |
| 6 | 1 byte | Client Node Number: the node number of the Client for the nearest AppleTalk Bridge |
| 7 | 1 byte | Bridge Node Number: the node number of the nearest AppleTalk Bridge |
| 8 | 2 bytes | Bridge Network Number: the network number of the nearest AppleTalk Bridge |
| 10 | 2 bytes | Network Range Start: The start of the network range for the AppleTalk network connected to the Host |
| 12 | 2 bytes | Network Range End: The end of the network range for the AppleTalk network connected to the Host |

This successful connection data is sent by the Host when a connection is successfully established between the Client and the Host. It contains the data necessary to configure the AppleTalk connection on the Client side. The connection success data structure thus contains the embedded information about the private data network communications protocol so that private network data may be communicated over the public network which has a different communications protocol. For example, the Bridge Node Number and Bridge Network Number specify AppleTalk specific network information, such as the AppleTalk default Bridge (or Router) on the network that the Host resides on. This embedded private data network information permits the client and the host to format their data formats, as set forth in Tables 10 and 11, for the particular connection to the particular type of private data network. This embedded information also permits the remote client to be treated as a virtual node of the AppleTalk network so that any devices, such as printers or file servers, on the private network may be accessed by the user of the remote client. The connection success data structure is sent unencrypted, unless a session key has been negotiated in the Session Key Negotiation phase, in which case it is encrypted. The connection failure data format is set forth in Table 8.

TABLE 8

Connection Failure

| Byte Offset | Width | Contents |
| --- | --- | --- |
| 0 | 2 bytes | Total Bytes: Total number of bytes in the transaction (excluding this field) |
| 2 | 2 bytes | Error Code: Contains the error code sent by the Host |

This connection failure data is sent by the Host when a connection cannot be successfully established between the Client and the Host. It contains a length field and only one other field, an Error Code field. The error code field contains an optional representation of why the connection failed. As a default, the host may always return an "Undefined Error" message, which gives no information on why it rejected the request. An example of the error codes are set forth below in Table 9.

TABLE 9

Error Codes

| Error Code | Description |
| --- | --- |
| 1 | Unsupported Authentication. This is returned when the Client sent an Authentication Response for an Authentication type which was not in the Authentication Request. |
| 2 | Failed Authentication. The specified User Name and Response were not valid for the authentication type and Challenge specified. Note: This could be any kind of error from unknown user to invalid password. |
| 3 | No Free Ports. The Host does not have any available ports. |
| 4 | Already Logged On. The specified User Name is already in use on this server, and multiple logins of the same user are disallowed. |
| 0xFFFF | Undefined Error. An error prevented the connection from succeeding. |

This error data is sent unencrypted, unless a session key has been negotiated in the Session Key Negotiation phase, in which case it is encrypted. If the connection failure data structure is sent, then the communications session ends. If a successful connection is established, then data is communicated between the host and the client using the data format for established data to the remote client as set forth in Table 10.

TABLE 10

Established Data (To Client)

| Byte Offset | Width | Contents |
| --- | --- | --- |
| 0 | 2 bytes | Length and Flags: contains the length of the following data in the low 10 bits and a set of reserved flags in the upper 6 bits. |
| 2 | 2 bytes | Source Network: the network number that sent the packet. |
| 4 | 1 byte | Source Node: the node number that sent the packet. |
| 5 | 1 byte | Destination Socket: the socket that the packet is being sent to. |
| 6 | 1 byte | Source Socket: the socket that sent the pocket. |
| 7 | 1 byte | Type: the AppleTalk type of the packet. |
| 8 | Specified by the Length | Payload: the data from the original packet. |

This data is sent from the Host to the Client during the established phase. As shown, the data contains the AppleTalk specific information to route the data packet to the client. This data is always encrypted. The basic format (with no flags set) contains data from one packet on the AppleTalk network that is destined for the Client. An example of the data format for data from the remote client to the host is set forth in Table 11.

TABLE 11

Established Data (From Client)

| Byte Offset | Width | Contents |
| --- | --- | --- |
| 0 | 2 bytes | Length and Flags: contains the length of the following data in the low 10 bits and a set of reserved flags in the upper 6 bits. |
| 2 | 2 bytes | Destination Network: the network number the packet is being sent to. |
| 4 | 1 byte | Destination Node: the node number the packet is being sent to. |
| 5 | 1 byte | Destination Socket: the socket that the packet is being sent to. |
| 6 | 1 byte | Source Socket: the socket that sent the packet. |
| 7 | 1 byte | Type: the AppleTalk type of the packet. |
| 8 | Specified by the Length | Payload: the data for the packet. |

This data is sent from the remote client to the host during the established phase in order to communicate data packets. The data includes AppleTalk specific information to route the client's data packets to the appropriate node on the private data network. The established data from the remote client to the host is always encrypted to ensure a secure communications channel. The basic format (without any flags set) contains data from one data packet that the remote client is sending to the host which is the AppleTalk network. There are not any special data formats for the teardown phase since no data is communicated between the remote client and the host during the teardown phase.

In summary, the invention provides a virtual private network system between a private data network and a remote client which does not require expensive leased lines or gateways to establish a secure communications path in which the remote client becomes a virtual node of the private network. The system also permits an individual to access the private data network without incurring any long distance telephone charges. In addition, the system permits a private data network and remote client that use a first communications protocol to communicate with each other over a public data network that uses a different communications protocol. The system also permits an individual to easily connect to the private date network as a virtual node without a remote private network and the individual appears to be a node on the private network, once connected, so that the individual may access any resources on the private data network.

In operation, a user of the remote client establishes a secure connection with the host of the private computer network through the authentication process so that the remote client is a virtual node of the private network. The user may then transmit data and commands in the private network's communication protocol over the public network through the secure communications path and receive data and commands back from the private network. For example, the user of the remote client may issue a print command to a printer attached to the private network, that print command is encapsulated in an encrypted data packet sent over the public access network, the host computer decrypts the print command and passes the print command on to the printer attached to the private network. Thus, the remote client is a virtual node of the private network and the user of the remote client may access any of the resources of the private network as if the remote client was an actual physical node of the private network.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for forming a virtual node for a private access network having a private access communications protocol over a public access network having a public access communications protocol, the virtual node being a remote computer and the method comprising:

establishing a secure communications path over the public access network between a host computer connected to the private network and a remote client computer to establish the remote client computer as a virtual node of the private network, the establishing including negotiating a communications protocol compatible with the private network between the host computer connected to the public access network and the remote client computer, the negotiating including negotiating one or more parameters governing future communications between the remote client computer and the host computer, wherein the negotiated parameters include an encryption technique;

generating a data packet to be transmitted over the secure communications path, the data packet including data and information about routing the data in the data packet in accordance with the private access communications protocol;

encrypting said data packet using the negotiated encryption technique;

encapsulating said encrypted data packet into second data packet having a format compatible with the public access communications protocol;

transmitting the second data packet over the public access network;

unpacking the encrypted data packet from said second data packet; and decrypting the data packet received from the public access network to route the data in the data packet over the private access network using the information about the private access communications protocol.

2. The method of claim 1, wherein said establishing further comprises authenticating the identity of the remote client computer.

3. The method of claim 2, wherein the authentication comprises generating a challenge at the host computer, communicating said challenge to the remote client computer, and receiving a challenge response from the remote client computer.

4. The method of claim 1 further comprising negotiating a session key for communicating between the host and the client.

5. The method of claim 1, wherein generating the information in the data packet comprises generating a network node identification number for the remote client node.

6. The method of claim 5, wherein said private access network comprises an AppleTalk communications network.

7. The method of claim 6, wherein said public access network comprises the Internet.

8. The method of claim 1, wherein the negotiated parameters include a protocol version.

9. The method of claim 1, wherein the negotiated parameters include a compression level.

10. The method of claim 1, wherein the negotiated encryption technique is data encryption standard (DES) encryption.

11. The method of claim 1, wherein the negotiated encryption technique is a non-data encryption standard (DES) encryption technique.

12. The method of claim 1, wherein the negotiated parameters include indication of whether to negotiate a session key.

13. The method of claim 1, wherein said negotiating the communications protocol includes sending a protocol request message from said remote client node to said host node, the protocol request message indicating a set of proposed parameters.

14. The method of claim 13, wherein the negotiating the communications protocol further includes means for sending a protocol response from said host node to said remote client node, the protocol response message indicating a set of accepted parameters.

15. A virtual node for a private access network having a private access communications protocol over a public access network having a public access communications protocol, the virtual node being a remote client computer and comprising:

means for establishing a secure communications path over the public access network between a host computer connected to the private network and a remote client computer to establish the remote client computer as a virtual node of the private network, the means for establishing including means for negotiating a communications protocol compatible with the private network between the host computer connected to the public access network and the remote client computer, the negotiating including negotiating one or more parameters governing future communications between the remote client computer and the host computer, wherein the negotiated parameters include an encryption technique;

means for generating a data packet to be transmitted over the secure communications path, the data packet including data and information about routing the data in the data packet in accordance with the private access communications protocol;

means for encrypting said data packet using the negotiated encryption technique;

means for encapsulating said encrypted data packet into second data packet having a format compatible with the public access communications protocol;

means for transmitting the second data packet over the public access network;

means for unpacking the encrypted data packet from said second data packet; and means for decrypting the data packet received from the public access network to route the data packet over the private access network using the information about the private access communications protocol.

16. The virtual node of claim 15, wherein said establishing means further comprises means for authenticating the identity of the remote client computer.

17. The virtual node of claim 16, wherein the authentication means comprises means for generating a challenge at the host computer, means for communicating said challenge to the remote client computer, and means for receiving a challenge response from the remote client computer.

18. The virtual node of claim 15 further comprising negotiating a session key for communicating between the host and the client.

19. The virtual node of claim 15, wherein said means for generating the information in the data packet comprises means for generating a network node identification number for the remote client node.

20. The virtual node of claim 19, wherein said private access network comprises an AppleTalk communications network.

21. The virtual node of claim 20, wherein said public access network comprises the Internet.

22. The virtual node of claim 15, wherein the negotiated parameters include a protocol version.

23. The virtual node of claim 15, wherein the negotiated parameters include a compression level.

24. The virtual node of claim 15, wherein the negotiated encryption technique is data encryption standard (DES) encryption.

25. The virtual node of claim 15, wherein the negotiated encryption technique is a non-data encryption standard (DES) encryption technique.

26. The virtual node of claim 15, wherein the negotiated parameters include indication of whether to negotiate a session key.

27. The virtual node of claim 15, wherein said means for negotiating the communications protocol includes sending a protocol request message from said remote client node to said host node, the protocol request message indicating a set of proposed parameters.

28. The virtual node of claim 27, wherein said means for negotiating the communications protocol further includes sending a protocol response from said host node to said remote client node, the protocol response message indicating a set of accepted parameters.

\* \* \* \* \*

UNITED STATES PATENT AND TRADEMARK OFFICE
CERTIFICATE OF CORRECTION

PATENT NO.    : 6,055,575
DATED         : April 25, 2000
INVENTOR(S)   : Gaige B. Paulsen et al.

It is certified that error appears in the above-identified patent and that said Letters Patent is hereby corrected as shown below:

Tile page,
Item [60], "Provisional application No. 60/035,215, Jan. 10, 1997." should read
-- Provisional application No. 60/036,215, Jan. 28, 1997 --;

Column 1,
Lines 4 and 5, "This application claims benefit of provisional application Ser. No. 60/035,215 filed Jan. 10, 1997." should read -- This application claims benefit of provisional application Ser. No. 60/036,215 filed Jan. 28, 1997. --;

Column 10,
Line 21, "now described" should read -- now be described --;

Column 12,
Line 47, "sucessful" should read -- successful --; and

Column 15,
Table 10, "Source Socket: the socket that sent the pocket." should read -- Source Socket: the socket that sent the packet. --.

Signed and Sealed this

Twelfth Day of February, 2002

Attest:

Attesting Officer

JAMES E. ROGAN
Director of the United States Patent and Trademark Office